United States Patent [19]

Pachner et al.

[11] Patent Number: 4,775,034
[45] Date of Patent: Oct. 4, 1988

[54] FLOATING-CALIPER DISC BRAKE

[75] Inventors: Andreas Pachner, Stuttgart; Hellmut Krohn, Esslingen, both of Fed. Rep. of Germany

[73] Assignee: Daimler-Benz Aktiengesellschaft, Stuttgart, Fed. Rep. of Germany

[21] Appl. No.: 931,077

[22] Filed: Nov. 17, 1986

[30] Foreign Application Priority Data

Nov. 16, 1985 [DE] Fed. Rep. of Germany ....... 3540810

[51] Int. Cl.$^4$ ..................... F16D 65/14; F16D 65/38; F16D 55/224
[52] U.S. Cl. .............. 188/73.45; 188/73.39; 188/71.1; 188/72.4
[58] Field of Search ................ 188/71.1, 73.39, 72.4, 188/73.1.73.35, 73.45, 73.47

[56] References Cited

U.S. PATENT DOCUMENTS

| 3,525,420 | 8/1970 | Honick et al. | 188/72.4 |
| 4,476,962 | 10/1984 | Bofill | 188/71.1 |

FOREIGN PATENT DOCUMENTS

| 080950 | 6/1983 | European Pat. Off. |  |
| 2831643 | 1/1980 | Fed. Rep. of Germany |  |
| 2907517 | 9/1980 | Fed. Rep. of Germany |  |
| 3121186 | 2/1982 | Fed. Rep. of Germany |  |
| 3347387 | 7/1985 | Fed. Rep. of Germany |  |
| 3411600 | 10/1985 | Fed. Rep. of Germany |  |
| 0109575 | 8/1979 | Japan | 188/73.45 |
| 1112989 | 5/1968 | United Kingdom |  |

*Primary Examiner*—Andres Kashnikow
*Assistant Examiner*—Richard Potosnak
*Attorney, Agent, or Firm*—Barnes & Thornburg

[57] ABSTRACT

A floating-caliper disc brake is designed to prevent both tangential and radial oblique wear of the brake linings, especially under high brake stress. To achieve this, the floating caliper, which is guided displaceably on a brake carrier in the direction of the disc axis and carries a brake piston and which engages over the brake disc, forms a frame which in the transitional region of the transverse frame leg on the run-out side, extending in the direction of the disc axis, and of the longitudinal frame leg supported on one brake pad is more pliant than in the transitional region between the longitudinal frame leg and the transverse frame leg located on the run-in side. The brake piston is arranged in the frame so as to be offset in the forward direction of rotation of the brake disc relative to the surface center of gravity of the brake pad actuable by the said brake piston, and the longitudinal frame leg supported on one brake pad extends level with the brake piston.

8 Claims, 2 Drawing Sheets

FLOATING-CALIPER DISC BRAKE

BACKGROUND AND SUMMARY OF THE INVENTION

The invention relates to a floating-caliper disc brake of the type with a brake carrier arranged fixedly on one side of a rotating brake disc. Two brake pads are provided which are each located adjacent to respectively one side of the brake disc and which are displaceable in the direction of the brake-disc axis and are supported on the brake carrier, in the peripheral direction of the disc, in order to transmit the braking torque. A floating caliper engages over the brake disc, is guided displaceably on the brake carrier in the direction of the disc axis, carries a brake piston supported on one brake pad, is supported on the other brake pad and, in its caliper part supported on the first brake pad, is more pliant on the run-out side than on the run-in side.

In those floating-caliper disc brakes having a floating caliper designed as a claw caliper engaging over the brake disc, uneven wear of the brake linings of the two brake pads occurs after even a relatively short time. This is especially so when they are used in heavy vehicles under high stress, specifically in that the brake lining of the brake pad which can be pressed against the brake disc by the brake piston undergoes greater tangential wear on the disc run-in side, relative to the forward direction of rotation of the brake disc, and the brake lining of the brake pad which can be pressed against the brake disc by the floating caliper experiences greater tangential wear on the disc run-out side.

The brake linings therefore wear in opposite directions to one another obliquely in relation to the plane in which is located the brake-disc endface adjacent to them.

This tangential oblique wear of the two brake linings is mainly caused by an elastic deformation of the brake carrier resulting from peripheral forces (braking forces). This results in the claw caliper mounted on the brake carrier being likewise shifted obliquely relative to the brake disc, and consequently the tangential wear of the lining is increased even further.

At the same time as this tangential oblique wear, radial oblique wear of the linings also occurs on disc brakes equipped with a claw caliper. This occurs because the clamping device formed by the claw caliper and the brake piston yields elastically under the effect of the clamping force. Consequently, the brake linings are not pressed against the brake-disc faces with a uniform pressure in the radial direction.

Both types of oblique wear (tangential as a result of deformation of the brake carrier under peripheral force and radial as a result of deformation of the claw caliper under clamping force) are, in the final analysis, due to uneven pressure exerted on the linings and cause an increase in the length of travel when the brake is operated.

To reduce or prevent tangential oblique wear, there are already known floating-caliper disc brakes, in which a special guide for the floating caliper on the brake carrier is provided for this purpose, that is to say this problem has been solved in a purely mechanical way see German Offenlegungsschrift No. 2,907,517; Great Britain patent specification No. 1,112,988; German Patent Application No. P 34 11 600).

There are also known floating-caliper disc brakes, in which the floating caliper has in places greater pliability in the peripheral direction of the disc (German Offenlegungsschrift No. 2,831,643 and German Patent Specification No. 3,121,186).

In these constructions, the floating caliper is supported on one brake pad by means of two claws arranged at a distance from one another in the Peripheral direction of the disc.

Where the brake construction according to German Offenlegungsschrift No. 2,831,643 is concerned, here the floating-caliper claw located on the run-out side relative to the forward direction of rotation of the brake disc has greater pliability.

Consequently, when the brake carrier pivots inwards as a result of deformation under the influence of braking forces, the floating caliper can give way elastically on the run-out side and thereby prevent tangential oblique wear. However, radial oblique wear is not prevented and is even increased because of the flexible floating-caliper claw.

In contrast, in the brake constructon according to German Patent Specification No. 3,121,186, the floating-caliper claw located on the run-in side has greater Pliability. However, this merely ensures that the vibrations caused by friction at the front edge of the outer brake lining are prevented or at least greatly reduced. This construction does not counteract oblique wear of the brake pads.

Finally, a floating-caliper disc brake of the type referred to above is already known (German Offenlegungsschrift No. 3,347,387). In this arrangement, in order to reduce tangential oblique wear of the brake pads, the floating-caliper has the greater pliability on the run-in side in the region of the caliper web engaging over the brake disc.

An object on which the invention is based is, in a floating-caliper disc brake of the above-noted type, to prevent both tangential and radial oblique wear of the brake linings, especially under high brake stress.

According to the invention, this object is achieved by both asymmetrically mounting the piston vis-a-vis the brake pad being actuated and by constructing the frame legs of the caliper to be more pliant on the run-out side than the run-in side. Also the longitudinal frame leg supporting the brake pad at the side of the disc opposite the piston extends to the level of the piston.

The advantage of constructing the floating-caliper as a frame according to the invention and of designing it specially for strength in the region of connection of its two transverse frame legs on the longitudinal frame leg supported on one brake pad is that, at the connecting point located o the run-out side, the floating frame has special elastic flexibility under the influence of the pressing forces bringing the brake pads into engagement with the brake disc. It is thereby possible for the pressing force exerted by the longitudinal frame leg on the brake pad supported on the latter to be applied asymmetrically, in such a way that it is lower on the run-out side than on the run-in side. This appropriately compensates the tangential wear of this brake pad which results from the deformation of the brake carrier and which occurs on the run-out side, so that a plane-parallel wear behaviour is obtained.

In contrast, the tangential oblique wear of the brake pad interacting directly with the brake piston or located on the same side as the piston is eliminated because the offset of the point of engagement of the brake piston on the brake pad in the direction of the run-out side of the brake carrier causes force to be exerted asymmetrically, as a result of which the tangential wear of this brake pad occurring on the run-in side can likewise be compensated.

In addition, arranging the longitudinal frame leg, supported on one brake pad, level with the brake piston results in a large-area support of the brake lining on the same side as the frame, this support remaining substantially plane-parallel relative to the brake-disc face under the stress of the clamping force and thus counteracting the formation of radial oblique wear of the brake pad.

Advantageous preferred embodiments of the invention optimally arrange the brake carrier to facilitate its ideal design in terms of rigidity. The reduction in the elastic deformation of the brake carrier, which can be obtained by designing it according to certain preferred embodiments, makes it possible to reduce correspondingly the asymmetry provided according to the inventin in the support of the brake pads (deliberate frame pliability on the one hand and the offset of the brake piston on the other hand) and to coordinate the components of the brake with one another in terms of their deformation behaviour.

At the same time, by taking the proposed measures into account, it becomes possible according to the invention to design the brake carrier and floating frame so that these parts can be coordinated with one another in such a way that an ideal wear behaviour of the brake pads is achieved, whilst at the same time ensuring the least possible weight of the parts.

Other objects, advantages and novel features of the present invention will become apparent from the following detailed description of the invention when considered in conjunction with the accompanying drawings.

DETAILED DESCRIPTION OF THE DRAWINGS

Figure 3:
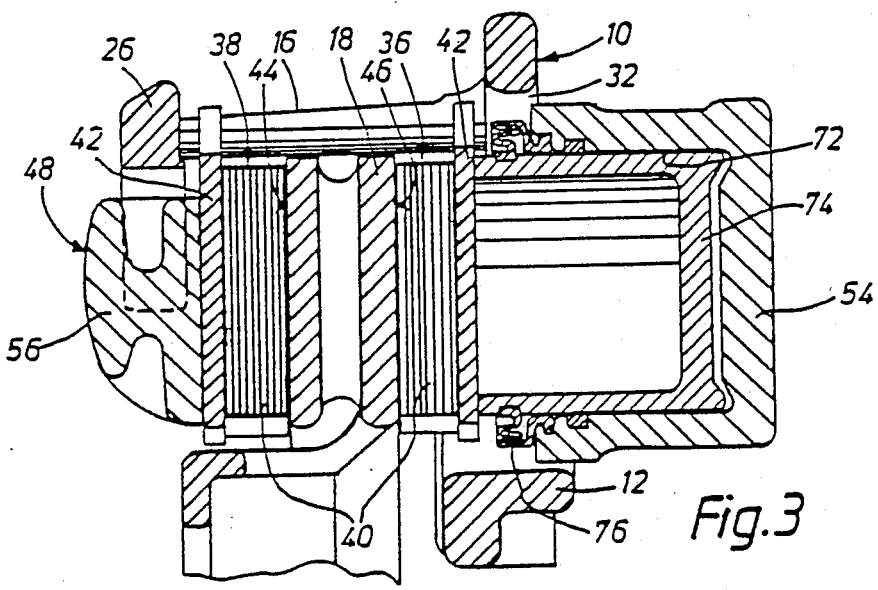
FIG. 3 is a sectional view through the brake taken along the line III—III of FIG. 2.

The brake illustrated has a brake carrier designated as a whole by 10, which, as shown in FIG. 3, is of L-shaped cross-section. Its vertical leg 12 can be fastened to a non-rotatable part of a vehicle by means of bolts (not shown) which pass through orifices 14. The other leg 16 of the brake carrier 10 extends in the axial direction of a rotatable brake disc 18 and engages over the latter in the upper peripheral part.

A rectangular orifice 20 is made in the leg 16, so that, in the direction of rotation of the brake disc indicated by an arrow, it forms, in the peripheral direction of the latter, two carrier arms which are arranged at a distance from one another and of which that designated by 22 is provided on the part of the brake carrier 10 located on the run-in side, relative to the forward direction of rotation of the brake disc 18, and that designated by 24 is provided on its part located on the run-out side.

26 denotes a bridge which connects the two carrier arms 22 and 24 rigidly to one another at their end facing away from the vertical leg 12.

A guide pin 28, 30 parallel to the axis of the brake disc 18 is assigned to each carrier arm 22, 24 within the orifice 20, and these guide pins 28, 30 are arranged at a lateral distance from one another and are arranged so as to be axially displaceable and lockable at their ends within the bridge 26 and within a connecting web 34 which limits at the top an orifice 32 passing through the vertical leg 12 and which extends between the two carrier arms 22 and 24. Two brake pads 36 and 38 are attached displaceably, by means of their support plates 42 carrying the brake linings 40, on these guide pins 28, 30 and are each adjacent to one of the two end faces 44 and 46 of the brake disc 18.

48 designates as a whole a floating frame which is guided on the brake carrier 10 so as to be displaceable in the axial direction of the brake disc 18. This floating frame comprises, relative to the forward direction of rotation of the brake disc 18, on the run-in side a front transverse frame leg 50 and, as seen in the peripheral direction of the disc, at a distance from this a rear transverse frame leg 52, these transverse frame legs extending in the direction of the disc axis and likewise engaging over the brake disc 18.

The transverse frame legs 50, 52 are connected to one another at each of their two ends by means of a longitudinal frame leg 54, 56.

The floating frame 48 is guided on the brake carrier 10 by means of a pair of guide bolts 58 and 60 which are each displaceable in a guide bore 62, 64 of the brake carrier 10. The guide bolts 58 and 60 are fastened to the longitudinal frame leg 54, and the guide bores 62, 64 receiving them each extend from the side of the connecting web 34 of the brake carrier 10 into one of the carrier arms 22 and 24. Protective caps 66 and 68 located on the guide bolts 58 and 60 prevent water and dust or dirt particles from penetrating into the bolt guides.

The longitudinal frame leg 54 of the floating frame 48 contains a guide cylinder 72, together with a piston 74 which is displaceable in the latter at the end of piston 74 projects from cylinder 72 and passes through the orifice 32 in the vertical brake-carrier leg 12 and is supported on the supporting plate 42 of the brake pad 36. A protective cap 76 prevents water and dust or the like from penetrating into the cylinder 72.

The supporting plate 42 of the brake pad 38 is supported on the inner longitudinal side of the longitudinal frame leg 56.

The bottom longitudinal edges, designated by 78, of the two carrier arms 22 and 24 and the bottom longitudinal edges 80 of the transverse frame legs 50 and 52 are lower than the upper peripheral part of the disc brake 18, over which the brake engages. Accordingly, the carrier arms 22 and 24 are appropriately cut out for the passage of the brake disc 18. Thus, the carrier arms 22, 24 and the transverse frame legs 50, 52 engage round the edge portion of the brake disc 18.

Figure 1:
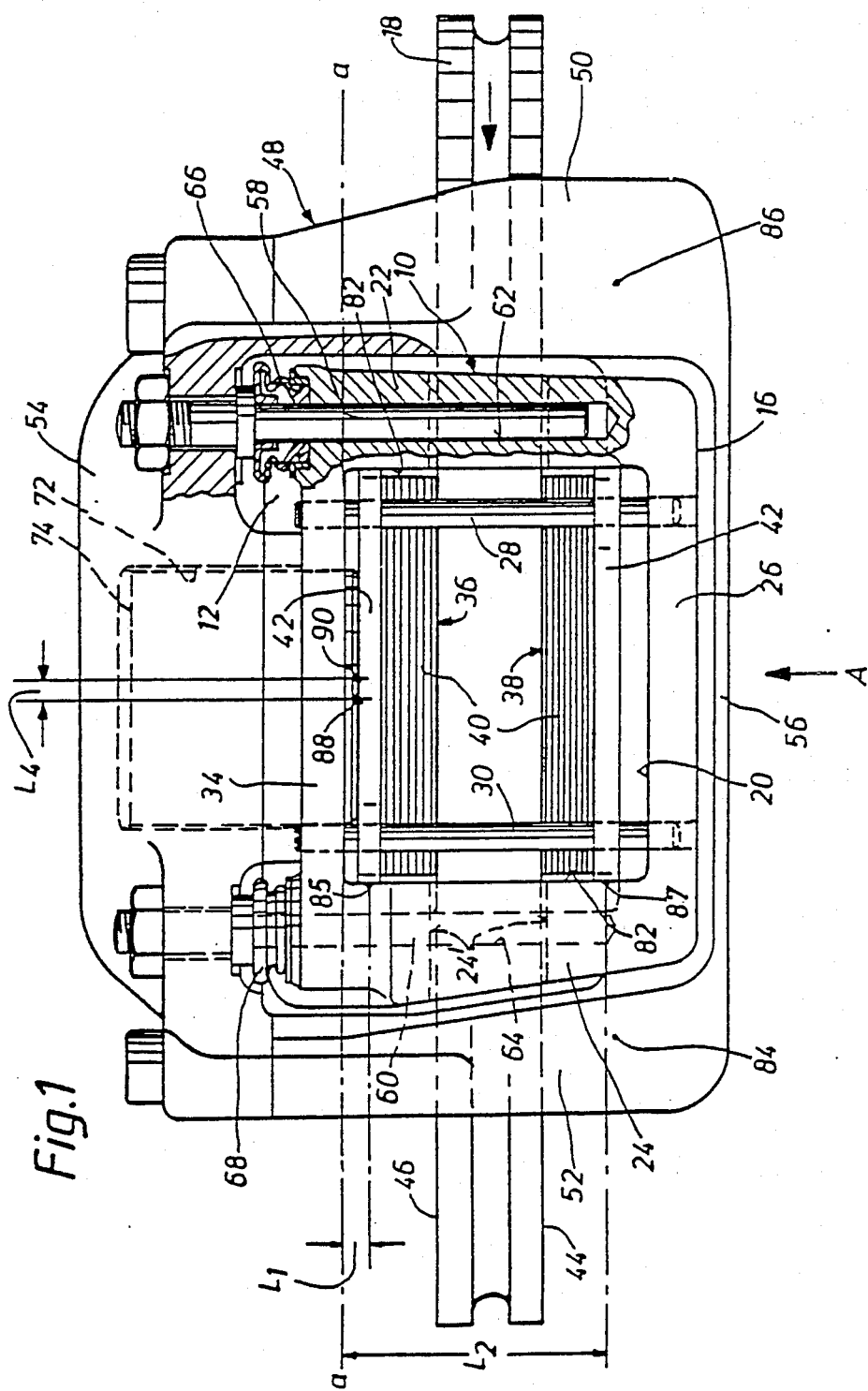
FIG. 1 is a plan schematic view of a brake constructed in accordance with a preferred embodiment of the invention.

As can be seen in FIG. 1, the supporting plates 42 of the brake pads 36, 38 bridge the distance between the two carrier arms 22, 24, and each of their end faces rests against a plane verticial supporting face 82 of each of these carrier arms.

Figure 2:
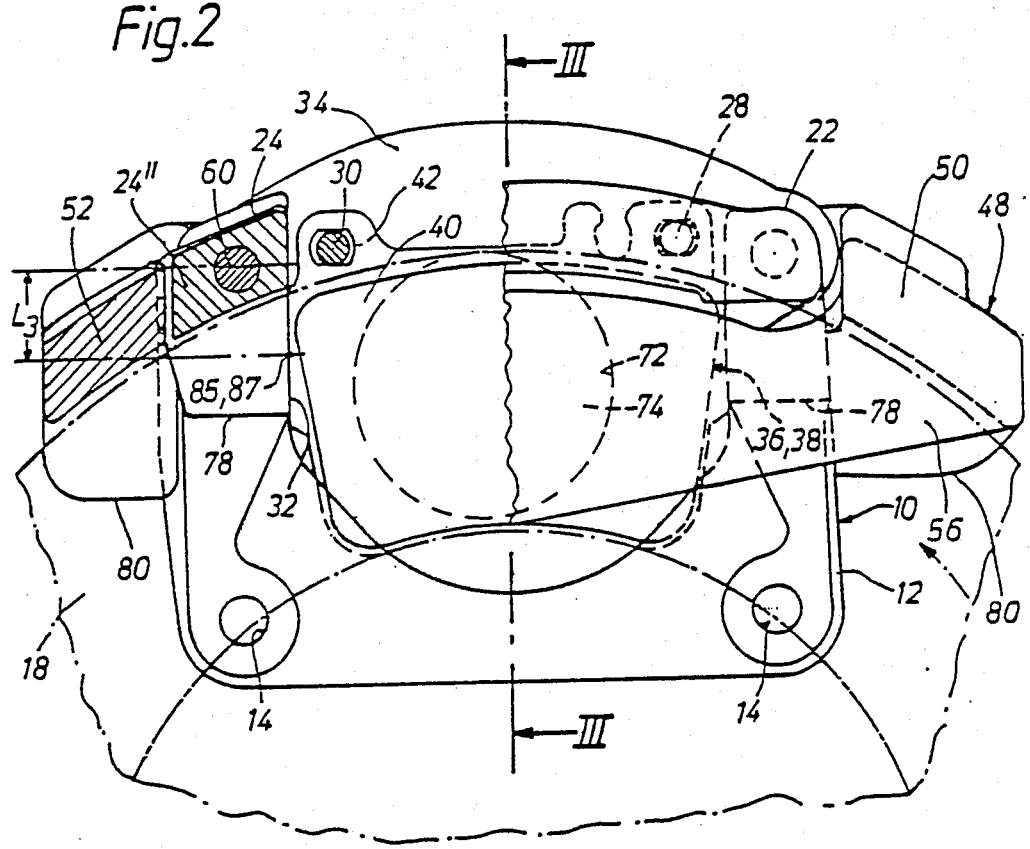
FIG. 2 is a schematic view of the brake, as seen in the direction of the arrow A in FIG. 1, its left-hand half being shown in section.

In order to brake a vehicle wheel travelling forwards, the brake pad 36 is engaged by means of the piston 74 with the end face, adjacent to it, of the rotating brake disc 18. As a result of the reaction force exerted thereby, the floating frame 48 is shifted in the opposite direction to the direction of movement of the piston 74, as a result of which, at the same time, the longitudinal frame leg 56 of the floating frame 48 brings the brake pad 38 into engagement with the other end face of the brake disc 18. At the same time, the peripheral or braking forces are supported by the carrier arm 28 at 85 and 87 (FIGS. 1 and 2).

In order to prevent both tangential and radial oblique wear of the brake linings 40 even under high brake stress, or achieve an ideal wear behaviour, the transitional region 84 (FIG. 1) between the transverse frame leg 52 located on the run-out side and the longitudinal frame leg 56 of the floating caliper frame 48 surrounding the brake carrier 10 is made more elastically flexible than the transitional region 86 between the transverse frame leg 50 located on the run-in side and the longitudinal frame leg 56, this being obtained by an appropriate calculation of the frame cross-section in these regions 84, 86. Futhermore, the longitudinal frame leg 56 is arranged, in the radial direction, underneath the bridge 26 connecting the carrier arms 22 and 24 to one another or level with the piston 74.

Moreover, relative to the forward direction of rotation of the brake disc 18, the point of engagement 88 (FIG. 1) of the piston 74 is offset from the central point 90 of the brake pad 36 by the amount $L_4$ in the direction of the run-out side of the brake carrier 10.

This design of the floating frame 48 means that, when the brake piston 74 is actuated and therefore when the brake pad 38 is pressed completely against the brake disc 18 as a result of the reaction movement of the floating frame 48, the longitudinal frame leg 56 transmitting the pressing force to the brake pad 38 is subjected to bending stress in the direction of the pressing force generated by the piston 74 and exerted on the brake pad 36, whilst the two transverse frame legs 50, 52 are subjected to tensile stress. Thus, in each of the two transitional regions 84 and 86 located on the run-in side and on the run-out side, the floating frame 48 is exposed to a combined tensile and bending stess.

Because the frame cross-section or main stress cross-section is made appropriately thicker in the transistional region 86 on the run-in side than in the transitional region 84, during braking the floating frame 48 yields elastically to an increased extent in the transititional region 84 under the bending stress of the longitudinal frame leg 56, with the result that the brake pad 38 is pressed with greater force against the brake disc 18 on the run-in side than on the run-out side, and consequently the customary lining wear which is higher on the run-out side is compensated accordingly.

The same result is obtained as regards the brake pad 36, by offsetting the brake piston 74 in the direction of the run-out side, because this brake pad is thereby pressed with greater force against the brake disc 18 on the run-out side than on the run-in side. An appropriately compensated lining wear likewise occurs on the run-in side as a result of this.

Radial oblique wear of the brake linings 40 is prevented by assigning the longitudinal frame leg 56 to the brake piston 74, because during braking the brake pad 38 is supported over a large area by this longitudinal frame leg 56, thus ensuring that its brake lining 40 rests against the brake disc 18 substantially plane-parallel.

Furthermore, the brake carier 10 is designed so that the desired prevention of tangential and radial lining wear can be obtained at a low outlay in terms of material for the floating frame 48 and brake carrier 10.

As shown in FIG. 1, the support point 85 of the supporting plate 42 of the brake pad 36 is at a distance $L_1$ from the fastening plan a-a of the brake carrier 10, and the support point 87 of the supporting plate 42 of the brake pad 38 is at a distance $L_2$ from the said fastening plane a—a.

Because of these distances, two cumulative bending moments. stressing the carrier arm 24 normally arise during braking. Furthermore, as shown in FIG. 2, the support points 85 and 87 of the two brake pads 36 and 38 are located at a distance $L_3$ from the axis of the guide bolt 60.

As a result of this distance, a torsional moment is also exerted on the carrier arm 24 during braking. The carrier arm 24 is designed so that, with the least possible outlay in terms of material for the brake carrier 10 as a whole, it is capable of opposing a sufficiently high moment of resistance to both the bending and tarsional stresses exerted on it, which arise from the moments and which conventionally result in an oblique position of the floating-caliper or brake linings 40 relative to the brake disc 18.

For this purpose, the carrier arm 24 has a higher bending and torsionaal resistance than its other arm 22. At the same time, in the region of its arm portion 24' engaging over the disc periphery, the arm stiffening necessary for this purpose is guaranteed with a correspondingly low outlay in terms of material, because the dimension of the cross section 24'' (FIG. 2) of this arm portion 24' is greater in the peripheral direction of the disc than it is transversely relative to the disc and perpendicularly relative to the longitudinal direction of the arm.

Because the carrier arms 22 and 24 are connected to one another by means of the bridge 26, it is also possible to reduce the cross-section of the carrier arm 24 correspondingly, because the braking forces are then also absorbed proportionately by the carrier arm 22.

Although the present invention has been described and illustrated in detail, it is to be clearly understood that the same is by way of illustration an example only, and is not to be taken by way of limitation. The spirit and scope of the present invention are to be limited only by the terms of the appended claims.

What is claimed:

1. Floating-caliper disc brake comprising: brake carrier means;
   brake pad means carried at said brake carrier means and disposed at respective opposite sides of a rotatable brake disc,
   floating-caliper means displaceably guided on the brake carrier means and engaging over the brake disc, and
   brake piston means actuable between the brake caliper means and brake pad means to apply brake actuating forces to the brake pad means,
   wherein the caliper means, as seen in plan view, forms a frame which surrounds the brake carrier means and includes a first transverse frame leg at a brake disc run-in side, a second tansverse frame leg at a brake disc run-out side and longitudinal frame legs disposed at opposite lateral sides of the carrier and connecting the first and second transverse frame legs, and wherein a transition region between the first transverse frame leg and one of the longitudinal frame legs exhibits a greater cross-sectional area than a transition region between the second transfer frame leg and said one of the longitudinal frame legs, whereby said caliper means exhibits more rigidity in reaction to braking pad forces at the brake run-in side than at the brake run-out side, wherein said brake piston is disposed offset in the forward direction of rotation of the brake disc relative to the center of gravity of the brake pad means, and wherein a longitudinal brake pad means supporting frame leg of the floating-caliper means, opposite the side of the brake piston means, is disposed at the level of the brake piston means to provide direct support over a large area of the brake pad means during braking operations.

2. Floating-caliper disc brake according to claim 1, further comprising the rotatable brake disc disposed to rotate between the brake pad means upon rotation of a vehicle wheel carrying the brake disc.

3. Floating-caliper disc brake according to claim 2, wherein, as seen in plan view, the floating-caliper means forms a frame which surrounds the brake carrier means, wherein, the carrier means includes a first carrier arm located on the run-in side and a second carrier arm located on the run-out side relative to the forward direction of rotation of the disc brake, wherein said carrier arms extend across the brake disc and transmit braking torque forces acting on the brake pad means during braking operations.

4. Floating-caliper disc brake according to claim 3, wherein said first carrier arm has a smaller cross-section than said second carrier arm so as to provide lesser resistance to deflection thereof during braking operations.

5. Floating-caliper disc brake according to claim 4, wherein the carrier arms engage around the edge of the brake disc, and wherein an arm portion of the second carrier arm engaging over the disc edge has a cross section with the dimension in the peripheral direction of the disc greater than the dimension in the transverse direction of the disc.

6. Floating-caliper disc brake according to claim 5, wherein the brake-carrier arms, at their arm ends facing away from the carrier part carrying them, are connected firmly to one another by means of a connecting web which is adjacent to an outer longitudinal edge of a longitudinal frame leg of the floating-caliper means.

7. Floating-caliper disc brake comprising: brake carrier means;

brake pad means carried at said brake carrier means and disposed at respective opposite sides of a rotatable brake disc, floating-caliper means displaceably guided on the brake carrier means and engaging over the brake disc, and brake piston means actuable between the brake caliper means and brake pad means to apply brake actuating forces to the brake pad means, wherein the caliper means is constructed with a larger cross-sectional area at the brake run-in side than at the brake run-out side so as to be more relatively rigid at the region thereof reacting to braking pad forces at the brake run-in side than at the brake run-out side during forward driving rotation of the brake disc, wherein said brake piston is disposed offset in the forward direction of rotation of the brake disc relative to the center of gravity of the brake pad means, wherein a longitudinal brake pad means supporting frame leg of the floating-caliper means, opposite the side of the brake piston means, is disposed at the level of the brake piston means to provide direct support over a large area of the brake pad means during braking operations, wherein the carrier means includes a first carrier arm located on the run-in side and a second carrier arm located on the run-out side relative to the forward direction of rotation of the disc brake, wherein said carrier arms extend across the brake disc and transmit braking torque forces acting on the brake pad means during braking operations, and wherein said first carrier arm has a smaller cross-section than said second carrier arm so as to provide lesser resistance to deflection thereof during braking operations.

8. Floating-caliper disc brake according to claim 7, wherein the carrier arms engage around the edge of the brake disc, and wherein an arm portion of the second carrier engaging over the disc edge has a cross section with the dimension in the peripheral direction of the disc greater than the dimension in the transverse direction of the disc.

* * * * *